United States Patent
O'Connell et al.

(10) Patent No.: US 12,415,723 B2
(45) Date of Patent: Sep. 16, 2025

(54) HYDROGEN PRODUCTION FROM GASIFICATION OF SOUR GAS

(71) Applicant: Saudi Arabian Oil Company, Dhahran (SA)

(72) Inventors: John O'Connell, Dhahran (SA); Megat A. Rithauddeen, Dhahran (SA); Jacobus Scholtz Kotze, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 115 days.

(21) Appl. No.: 18/473,613

(22) Filed: Sep. 25, 2023

(65) Prior Publication Data
US 2025/0100873 A1    Mar. 27, 2025

(51) Int. Cl.
*C01B 3/04* (2006.01)
*C01B 3/26* (2006.01)

(52) U.S. Cl.
CPC ............. *C01B 3/04* (2013.01); *C01B 3/26* (2013.01); *C01B 2203/0277* (2013.01); *C01B 2203/0283* (2013.01); *C01B 2203/0485* (2013.01); *C01B 2203/0495* (2013.01); *C01B 2203/062* (2013.01); *C01B 2203/1235* (2013.01); *C01B 2203/148* (2013.01)

(58) Field of Classification Search
None
See application file for complete search history.

(56) References Cited

U.S. PATENT DOCUMENTS

| | | |
|---|---|---|
| 4,141,696 A | 2/1979 | Charles et al. |
| 11,434,132 B2 * | 9/2022 | Musawi ................. C01F 11/00 |
| 11,453,588 B2 * | 9/2022 | O'Connell .......... C01B 17/0447 |
| 2005/0261382 A1 | 11/2005 | Keyser et al. |

(Continued)

FOREIGN PATENT DOCUMENTS

| | | |
|---|---|---|
| EP | 4140944 | 3/2023 |
| JP | 2010084060 | 4/2010 |

(Continued)

OTHER PUBLICATIONS

[No Author Listed], "Catalysts and adsorbents," Product Listing, Axens, 2004, 14 pages.

(Continued)

*Primary Examiner* — John J Figueroa
(74) *Attorney, Agent, or Firm* — Fish & Richardson P.C.

(57) ABSTRACT

A sour gas stream is sub-stoichiometrically combusted to produce soot and a sour syngas stream. At least 10% of the carbon in the sour gas stream is converted into the soot. At least a portion of the hydrogen sulfide of the sour syngas stream is reacted with sulfur dioxide to produce a syngas stream comprising the carbon dioxide, the carbon monoxide, the hydrogen, water, elemental sulfur vapor, a residual portion of the hydrogen sulfide, and a residual portion of the sulfur dioxide. The syngas stream is reacted with steam to produce a shifted sour gas stream including more carbon dioxide, more hydrogen, more hydrogen sulfide, and less carbon monoxide in comparison to the syngas stream. Water and hydrogen sulfide is separated from the shifted sour gas (Continued)

stream to produce a sweet gas stream. The sweet gas stream is separated into a hydrogen product stream and an exhaust stream.

8 Claims, 3 Drawing Sheets

(56) References Cited

U.S. PATENT DOCUMENTS

| | | | |
|---|---|---|---|
| 2012/0094337 A1* | 4/2012 | Van Den Born | ... C01B 17/0408 |
| | | | 435/157 |
| 2017/0253818 A1* | 9/2017 | Williams | ............... C10J 3/721 |
| 2020/0377365 A1* | 12/2020 | Mortensen | ........... B01J 19/0013 |
| 2024/0132349 A1 | 4/2024 | O'Connell | |

FOREIGN PATENT DOCUMENTS

| | | |
|---|---|---|
| WO | WO 2007032850 A2 | 3/2007 |
| WO | WO 2007134075 A2 | 11/2007 |
| WO | WO 2017096337 | 6/2017 |
| WO | WO 2021204708 A1 | 10/2021 |

OTHER PUBLICATIONS

[No Author Listed], "Euro Support—Sulphur Recovery Catalysts," Euro Support, 2015, 7 pages.

Chakroun et al., "High-efficiency low LCOE combined cycles for sour gas oxy-combustion with CO2 capture," International Journal of Greenhouse Gas Control, Oct. 2015, 41:163-173, 32 pages.

Davidson, "Pre-combustion capture of $CO_2$ in IGCC plants," IEA Clean Coal Centre, Dec. 2011, 98 pages.

Heinzel et al., "Reforming of natural gas-hydrogen generation for small scale stationary fuel cell systems," Journal of Power Sources, Mar. 2002, 105(2):202-207, 6 pages.

Sarioğlan "Tar removal on dolomite and steam reforming catalyst: Benzene, toluene and xylene reforming," International Journal of Hydrogen Energy, 2012, 37: 8133-8142, 10 pages.

Smith et al., "A Review of the Water Gas Shift Reaction Kinetics," International Journal of Chemical Reactor Engineering, Jan. 2010, 8(1), 35 pages.

International Search Report and Written Opinion in International Appln. No. PCT/US2024/048143, mailed on Jan. 13, 2025, 16 pages.

* cited by examiner

HYDROGEN PRODUCTION FROM GASIFICATION OF SOUR GAS

TECHNICAL FIELD

This disclosure relates to gasification, and in particular, gasification of sour gas to produce hydrogen.

BACKGROUND

Hydrogen sulfide and carbon dioxide exist in various gas streams, including natural gas. Oil or gas that contains significant amounts of sulfur compounds like hydrogen sulfide is considered "sour", and oil refineries and gas processing plants utilize "sweetening" processes to remove such sulfur compounds. Typical sulfur recovery processes selectively remove acid gases, such as hydrogen sulfide and carbon dioxide, from gas mixtures. The hydrogen sulfide can then be converted into elemental sulfur and, in some cases, sulfur dioxide. The carbon dioxide, on the other hand, is typically released into the atmosphere without further use.

SUMMARY

This disclosure describes technologies relating to gasification of sour gas to produce hydrogen. Certain aspects of the subject matter described can be implemented as a method. A sour gas stream is combusted within a reactor in the presence of oxygen to produce soot and a sour syngas stream comprising carbon dioxide, carbon monoxide, hydrogen, and hydrogen sulfide. The sour gas stream includes hydrogen sulfide and at least one hydrocarbon. Combusting the sour gas stream within the reactor includes sub-stoichiometric combustion of the sour gas stream, wherein the sour gas stream has a molar content of carbon (C) and a molar content of hydrogen (H), wherein a molar content of oxygen gas in the reactor is in a range of from 10% to 70% of $C+H/4$. The sub-stoichiometric combustion of the sour gas stream within the reactor converts at least 10% of the carbon in the sour gas stream into the soot. At least a portion of the hydrogen sulfide of the sour syngas stream is reacted with sulfur dioxide to produce a syngas stream that includes the carbon dioxide, the carbon monoxide, the hydrogen, water, elemental sulfur vapor, a residual portion of the hydrogen sulfide, and a residual portion of the sulfur dioxide. Reacting at least the portion of the hydrogen sulfide of the sour syngas stream with sulfur dioxide produces a sulfur stream comprising elemental sulfur liquid. The syngas stream is contacted, in the presence of steam, with a water-gas shift hydrogenation catalyst in a shift reactor to convert at least a portion of the carbon monoxide and steam to carbon dioxide and hydrogen to produce a shifted sour gas stream. Contacting the syngas stream with the water-gas shift hydrogenation catalyst in the shift reactor in the presence of steam reduces the elemental sulfur vapor and the residual portion of the sulfur dioxide into hydrogen sulfide. The shifted sour gas stream is substantially free of elemental sulfur and sulfur dioxide. Water is separated from the shifted sour gas stream to produce a dehydrated sour gas stream. The dehydrated sour gas stream is contacted with a lean amine solvent to extract the residual portion of the hydrogen sulfide from the dehydrated sour gas stream into the lean amine solvent to produce a sweet gas stream and a rich amine solvent. The sweet gas stream includes the carbon dioxide and the hydrogen. The sweet gas stream can be saturated with water (steam) at the operating conditions of the sweet gas stream. For example, the sweet gas stream can include about 3-5 volume percent steam. The residual portion of the hydrogen sulfide is boiled off from the rich amine solvent to produce an acid gas stream and regenerate the lean amine solvent. The acid gas stream includes the residual portion of the hydrogen sulfide. The sweet gas stream is separated to produce a hydrogen product stream and an exhaust stream. The hydrogen product stream includes a majority of the hydrogen from the sweet gas stream, and the exhaust stream includes a remainder of the sweet gas stream.

This, and other aspects, can include one or more of the following features. In some implementations, at least a portion of heat generated from sub-stoichiometric combustion of the sour gas stream within the reactor is directed to a boiler to generate steam and cool the soot and sour syngas to a temperature in a range of from about 250 degrees Celsius (° C.) to about 500° C. In some implementations, at least a portion of the steam stream is sourced from the steam generated by the boiler. In some implementations, at least a portion of the steam generated by the boiler is flowed through a steam turbine, and the steam turbine generates electrical power in response to flow of the portion of the steam through the turbine. In some implementations, separating water from the shifted sour gas stream includes contacting the shifted sour gas stream with a water stream within a quench tower and discharging a reject water stream and the dehydrated sour gas stream from the quench tower. In some implementations, at least a portion of the acid gas stream is recycled to the reactor. In some implementations, at least a portion of the exhaust stream is recycled to the reactor. In some implementations, a second portion of the exhaust stream is sequestered within a subterranean formation to avoid releasing carbon dioxide to the atmosphere. In some implementations, a high pressure raw sour gas stream is processed in a feed pre-treatment unit. Processing the high pressure raw sour gas stream in the feed pre-treatment unit can include separating water from the high pressure raw sour gas stream and condensing natural gas liquids from the high pressure raw sour gas stream to produce a natural gas liquids (NGL) stream and the sour gas stream. In some implementations, the sour gas stream is flowed through a turboexpander prior to combusting the sour gas stream within the reactor. The turboexpander can generate electrical power in response to flow of the sour gas stream through the turboexpander.

Certain aspects of the subject matter described can be implemented as a system. The system includes a sour gas stream, an oxidizing stream, a combustion reactor, a mechanical separator, a Claus unit, a sour shift/hydrogenation reactor, a quench tower, an amine unit, and a purifier. The sour gas stream includes hydrogen sulfide and at least one hydrocarbon. The sour gas stream has a molar flow rate of carbon (C) and a molar flow rate of hydrogen (H). The oxidizing stream includes oxygen gas and has a molar flow rate of oxygen gas ($O_2$) in a range of from 10% to 70% of $C+H/4$. The combustion reactor is configured to receive the sour gas stream and the oxidizing stream. The combustion reactor is configured to combust the sour gas stream to produce soot and sour syngas. Sub-stoichiometric combustion of the sour gas stream within the combustion reactor converts at least 10% of the carbon in the sour gas stream into soot. The mechanical separator is configured to separate the soot from the sour syngas to produce a sour syngas stream comprising carbon dioxide, carbon monoxide, hydrogen, and hydrogen sulfide. The Claus unit is configured to receive the sour syngas stream and a sulfur dioxide stream that includes sulfur dioxide. The Claus unit is configured to react at least a portion of the hydrogen sulfide of the sour syngas stream with the sulfur dioxide of the sulfur dioxide stream to produce elemental sulfur and water. The Claus unit is configured to discharge a sulfur stream that includes the elemental sulfur. The Claus unit configured to discharge a syngas stream that includes the carbon dioxide, the carbon monoxide, the hydrogen, the water, elemental sulfur vapor, a residual portion of the hydrogen sulfide, and a residual portion of the sulfur dioxide. The sour shift/hydrogenation reactor is configured to receive the syngas stream and steam. The sour shift/hydrogenation reactor includes a water-gas shift hydrogenation catalyst. The water-gas shift hydrogenation catalyst is configured to convert at least a portion of the carbon monoxide of the syngas stream and steam to carbon dioxide and hydrogen to produce a shifted sour gas stream. The water-gas shift hydrogenation catalyst is configured to reduce the elemental sulfur vapor and the residual portion of the sulfur dioxide into hydrogen sulfide. The shifted sour gas stream is substantially free of elemental sulfur and sulfur dioxide. The quench tower is configured to receive the shifted sour gas stream and separate water from the shifted sour gas stream to produce a dehydrated sour gas stream. The amine unit is configured to receive the dehydrated sour gas stream. The amine unit is configured to contact the dehydrated sour gas stream with a lean amine solvent to extract the residual portion of the hydrogen sulfide from the dehydrated sour gas stream into the lean amine solvent to produce a sweet gas stream and a rich amine solvent. The sweet gas stream includes the carbon dioxide and the hydrogen. The amine unit is configured to boil off the residual portion of the hydrogen sulfide from the rich amine solvent to produce an acid gas stream and regenerate the lean amine solvent. The acid gas stream includes the residual portion of the hydrogen sulfide. The purifier is configured to receive the sweet gas stream and separate hydrogen from the sweet gas stream to produce a hydrogen product stream and an exhaust stream. The hydrogen product stream includes a majority of the hydrogen from the sweet gas stream. The exhaust stream includes a remainder of the sweet gas stream. The combustion reactor is configured to receive at least a portion of the exhaust stream.

This, and other aspects, can include one or more of the following features. In some implementations, the system includes a boiler configured to use heat generated from combustion of the sour gas stream within the combustion reactor to generate steam and cool the soot and sour syngas to a temperature in a range of from about 250 degrees Celsius (° C.) to about 500° C. In some implementations, the sour shift/hydrogenation reactor is configured to receive at least a portion of the steam generated by the boiler. In some implementations, the system includes a steam turbine configured to receive at least a portion of the steam generated by the boiler. The steam turbine can be configured to generate electrical power in response to the portion of the steam flowing through the steam turbine. In some implementations, the combustion reactor is configured to receive at least a portion of the acid gas stream. In some implementations, a second portion of the exhaust stream is sequestered within a subterranean formation to avoid releasing carbon dioxide to the atmosphere. In some implementations, the system includes a feed pre-treatment unit upstream of the combustion reactor. The feed pre-treatment unit can be configured to process a high pressure raw sour gas stream to separate water and natural gas liquids from the high pressure raw sour gas stream to produce a reject water stream, a natural gas liquids (NGL) stream, and the sour gas stream. In some implementations, the system includes a turboexpander downstream of the feed pre-treatment unit and upstream of the combustion reactor. The turboexpander can be configured to receive the sour gas stream and generate electrical power in response to flow of the sour gas stream through the turboexpander. The turboexpander can be configured to discharge the sour gas stream to the combustion reactor.

Certain aspects of the subject matter described can be implemented as a method. A sour gas stream is combusted in the presence of oxygen to produce soot and a sour syngas stream comprising carbon dioxide, carbon monoxide, hydrogen, and hydrogen sulfide. The sour gas stream includes hydrogen sulfide and at least one hydrocarbon. Combusting the sour gas stream includes sub-stoichiometric combustion of the sour gas stream. The sour gas stream has a molar content of carbon (C) and a molar content of hydrogen (H). A molar content of the oxygen that is present is in a range of from 10% to 70% of C+H/4. The sub-stoichiometric combustion of the sour gas stream converts at least 10% of the carbon in the sour gas stream into the soot. At least a portion of the hydrogen sulfide of the sour syngas stream is reacted with sulfur dioxide to produce a syngas stream that includes the carbon dioxide, the carbon monoxide, the hydrogen, water, elemental sulfur vapor, a residual portion of the hydrogen sulfide, and a residual portion of the sulfur dioxide. Reacting at least the portion of the hydrogen sulfide of the sour syngas stream with sulfur dioxide produces a sulfur stream comprising elemental sulfur liquid. At least a portion of the carbon monoxide of the syngas stream is reacted with steam in the presence of a water-gas shift hydrogenation catalyst to produce a shifted sour gas stream. The shifted gas sour stream includes more carbon dioxide, more hydrogen, more hydrogen sulfide, and less carbon monoxide in comparison to the syngas stream prior to reacting the carbon monoxide. The shifted sour gas stream is substantially free of elemental sulfur and sulfur dioxide. Water and the residual portion of the hydrogen sulfide are separated from the shifted sour gas stream to produce a sweet gas stream. The sweet gas stream is separated into a hydrogen product stream and an exhaust stream. The hydrogen product stream includes a majority of the hydrogen from the sweet gas stream. The exhaust stream includes a remainder of the sweet gas stream.

This, and other aspects, can include one or more of the following features. In some implementations, at least a portion of heat generated from combustion of the sour gas stream is directed to a boiler to generate steam and using at least a portion of the generated steam to react with at least the portion of the carbon monoxide of the syngas stream in the presence of the water-gas shift hydrogenation catalyst.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
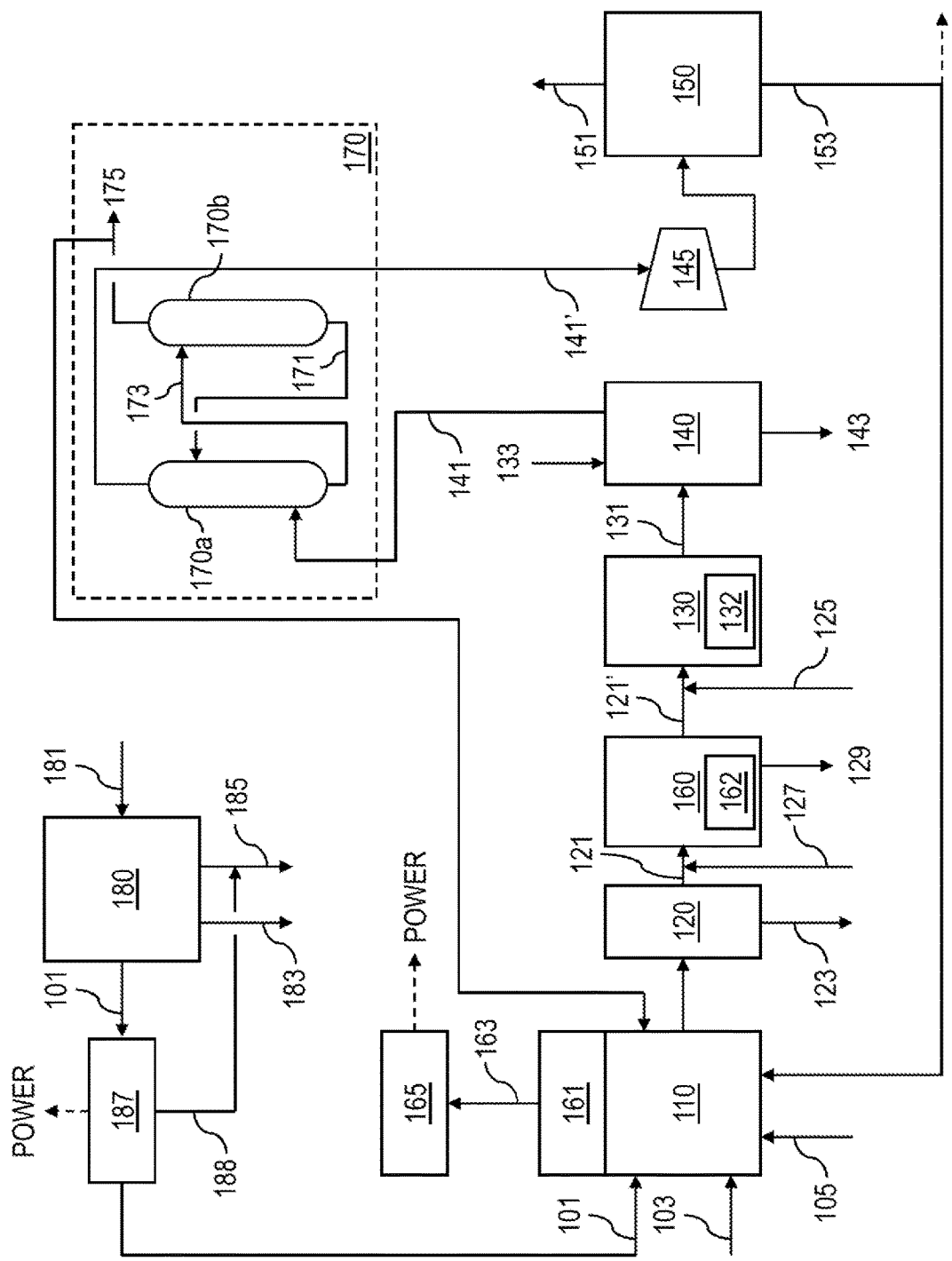
FIG. 1 is a schematic diagram of an example system for producing hydrogen from gasification of sour gas.

This disclosure describes hydrogen production that includes sub-stoichiometric combustion of sour gas (sour gas gasification), a multi-stage Claus process, a hydrogenation reactor for water-gas shift and sulfur compound reduction and hydrolysis, and a low pressure amine system. The sub-stoichiometric combustion of hydrocarbons produces sour syngas (carbon monoxide, hydrogen, and possibly sulfur dioxide ($SO_2$) and sulfur) and maximizes soot production for the purpose of reducing the amount of carbon dioxide produced in the combustion process. The heat from combustion is used to generate steam. Unreacted hydrogen sulfide is converted and recovered as elemental sulfur in the multi-stage Claus process. The syngas is then processed in a hydrogenation reactor to convert the carbon monoxide into additional hydrogen via the water-gas shift reaction and to reduce and hydrolyze sulfur compounds back to $H_2S$. Steam (produced by the heat from combustion) may be added to the hydrogenation reactor to promote conversion of carbon monoxide into hydrogen. The outlet stream from the hydrogenation reactor is quenched to cool the outlet stream and to separate water. The outlet stream is then further processed in a low pressure absorber for the removal of $H_2S$. The remaining portion of the outlet stream (excluding water) is a hydrogen-rich stream. The hydrogen-rich stream can be further processed (for example, by a membrane or a pressure swing adsorption process) to separate contaminants and purify the hydrogen-rich stream. Residual carbon monoxide, carbon dioxide, light hydrocarbons (such as methane), and hydrogen sulfide can be recycled for re-processing and increasing the overall efficiency of the system.

The subject matter described in this disclosure can be implemented in particular implementations, so as to realize one or more of the following advantages. The processes and systems described can minimize or eliminate carbon dioxide production when converting hydrocarbons into hydrogen. For example, these processes and systems implement partial oxidation (sub-stoichiometric combustion) of hydrocarbons to specifically target maximum soot production and minimum carbon dioxide production. The soot that is produced can be processed into other useful forms of carbon and/or sold to the market. These processes and systems can implement process and heat integration, such that heat produced within the process/system can be used elsewhere in the process/system. As such, these processes and systems can be less energy intensive in comparison to conventional hydrogen production processes. Carbon dioxide produced by the system can be recycled within the system and/or sequestered in a subterranean formation to avoid release of greenhouse gases into the atmosphere. These systems and methods not only produce hydrogen, which is a useful gas, but also sweeten sour gas (that is, removes sulfur compounds such as $H_2S$ from the gas stream) and produce electrical power, which can be used internally by the respective systems and methods, be provided to another end user, be provided to a power grid, or any combinations of these.

FIG. 1 depicts an example system 100 for hydrogen production from gasification of sour gas. The system 100 can be carbon neutral in that carbon dioxide emissions from the system 100 are at or close to net zero. That is, all or substantially all of the carbon dioxide produced by the system 100 is subsequently used by the system 100 and/or sequestered in a subterranean formation, such that no (or a negligible amount of) carbon dioxide is released to the atmosphere. The system 100 includes a combustion reactor 110, a mechanical separator 120, a shift/hydrogenation reactor 130, a quench tower 140, a purifier 150, a Clause unit 160, and an amine unit 170. The system 100 includes a sour gas stream 101 and an oxidizing stream 103. The sour gas stream 101 includes hydrogen sulfide ($H_2S$) and at least one hydrocarbon (for example, methane, ethane, propane, or butane). For example, the sour gas stream 101 is a natural gas stream including methane and $H_2S$. As another example, the sour gas stream 101 is a sour gas stream that has been separated from a liquefied petroleum gas (LPG) stream that includes propane, butane, or both. A molar flow rate of carbon in the sour gas stream 101 is C. A molar flow rate of hydrogen in the sour gas stream 101 is H. The oxidizing stream 103 includes oxygen gas ($O_2$). In some implementations, the oxidizing stream 103 is predominantly oxygen (for example, high purity oxygen with an oxygen concentration of greater than 99%). In some implementations, the oxidizing stream 103 is air, which includes oxygen. A molar flow rate of oxygen gas ($O_2$) is O. The combustion reactor 110 is configured to receive the sour gas stream 101 and the oxidizing stream 103 and is configured to combust the sour gas stream 101 in the presence of steam to produce soot and sour syngas. In some implementations, the combustion reactor 110 is configured to combust the sour gas stream 101 in the absence of steam to produce soot and sour syngas (that is, in some cases, steam is not necessary to produce the soot and sour syngas). In some implementations, the system 100 includes a first steam stream 105, which flows to the combustion reactor 110 to provide temperature control and replenish steam supply for steam reforming reaction(s) within the combustion reactor 110.

The ratio of oxygen in the oxidizing stream 103 to hydrocarbons in the sour gas stream 101 is sub-stoichiometric in relation to combustion. Sub-stoichiometric combustion is also referred to as partial oxidation. O is in a range of from 10% to 70% of C+H/4. As one example, the sour gas stream 101 can include 100 moles per hour of methane, and then for stoichiometric combustion (complete 100% combustion), the balanced chemical reaction is:

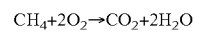

In other words, for stoichiometric combustion for a methane stream, so 2 moles of oxygen gas ($O_2$) is needed per mole of methane ($CH_4$) (which confirms: C=1; H=4; C+H/4=2). For the sub-stoichiometric combustion of the sour gas stream 101, the rate of oxygen flow in the oxidizing stream 103 is from 10% to 70% of the oxygen rate necessary for stoichiometric combustion. For this specific example (where the sour gas stream 101 includes 100 moles per hour of methane), the oxidizing stream 103 includes from 20 moles per hour (10%) to 140 moles per hour (70%) of oxygen gas ($O_2$). Sub-stoichiometric combustion of the sour gas stream 101 produces additional products (apart from just carbon dioxide and water), such as hydrogen ($H_2$), carbon monoxide (CO), and solid carbon (C).

Providing a sub-stoichiometric ratio of oxygen to hydrocarbons in the combustion reactor 110 increases the rate of soot production within the combustion reactor 110, which in turn reduces the rate of carbon dioxide production within the combustion reactor 110. The combustion reactor 110 is configured to convert at least 10% of the carbon in the sour gas stream 101 into soot (as opposed to carbon dioxide) as a result of the sub-stoichiometric combustion of the sour gas stream 101 within the combustion reactor 110. In some implementations, the combustion reactor 110 is configured to convert at least 20%, at least 30%, at least 40%, or at least 50% of the carbon in the sour gas stream 101 into soot as a result of the sub-stoichiometric combustion of the sour gas stream 101 within the combustion reactor 110. For example, the combustion reactor 110 is configured to convert from about 10% to about 80%, from about 20% to about 70%, from about 30% to about 60%, from about 40% to about 50% of the carbon in the sour gas stream 101 into soot as a result of the sub-stoichiometric combustion of the sour gas stream 101 within the combustion reactor 110.

The mechanical separator 120 receives the soot and the sour syngas that was produced in the combustion reactor 110. The mechanical separator 120 is configured to separate the soot (solid carbon) from the sour syngas to produce a sour syngas stream 121. The sour syngas stream 121 includes carbon dioxide, carbon monoxide, hydrogen, and hydrogen sulfide. In some cases, the sour syngas stream 121 includes a low level of sulfur dioxide ($SO_2$). In some implementations, the sour syngas stream 121 includes unreacted hydrocarbons originating from the sour gas stream 101, such as methane and/or other hydrocarbon(s). The mechanical separator 120 can capitalize on the effects of gravity to separate the soot from the sour syngas by taking advantage of the difference in density of the components. The mechanical separator 120 can include, for example, a cyclonic separator. In some implementations, the mechanical separator 120 includes a filter (such as a bag filter) that allows gaseous components (such as the syngas) to pass through the filter while preventing solid components (such as the soot) from passing through the filter to separate the soot from the sour syngas. In some implementations, the mechanical separator 120 includes a water spray injection and/or a wash column that can facilitate coalescence of the soot particles to more easily separate the soot from the sour syngas. The soot 123 that is separated from the mechanical separator 120 can be disposed, used for power generation, or processed, for example, to produce useful forms of carbon, such as carbon black, synthetic graphite, carbon filaments/fiber, and/or carbon nanostructures (such as carbon nanotubes or carbon nanofibers). In some implementations, the system 100 includes a preheater (not shown) downstream of the mechanical separator 120 and upstream of the Clause unit 160. In cases where the system 100 includes the preheater, the preheater can re-heat the sour syngas stream 121 to an operating temperature suitable for promoting the reaction(s) occurring in the Claus unit 160. The preheater can, for example, utilize steam to re-heat the sour syngas stream 121.

The Claus unit 160 is configured to receive the sour syngas stream 121 and a sulfur dioxide stream 127 that includes sulfur dioxide. In some implementations, the sulfur dioxide stream 127 is provided at a flow rate that supplies sufficient sulfur dioxide to achieve a molar ratio of 2:1 for hydrogen sulfide to sulfur dioxide ($H_2S: SO_2$) entering the Claus unit 160. In some implementations, the sour syngas stream 121 mixes with the sulfur dioxide stream 127 before entering the Claus unit 160. In some implementations, the sour syngas stream 121 and the sulfur dioxide stream 127 separately enter the Claus unit 160 and mix within the Claus unit 160. The Claus unit 160 is configured to react at least a portion of the hydrogen sulfide of the sour syngas stream 121 with the sulfur dioxide of the sulfur dioxide stream 127 to produce sulfur and water. The Claus unit 160 is configured to discharge a sulfur stream 129 that includes the sulfur produced in the Claus unit 160. The Claus unit 160 is configured to discharge a syngas stream 121' that includes the carbon dioxide, the carbon monoxide, the hydrogen, the water, sulfur (vapor), and a residual portion of the hydrogen sulfide and sulfur dioxide that did not react in the Claus unit 160. The syngas stream 121' exiting the Claus unit 160 has a lower hydrogen sulfide content in comparison to the sour syngas stream 121 entering the Claus unit 160. The sulfur produced by the Claus unit 160 can be separated from the gas to produce the sulfur stream 129. In some implementations, the Claus unit 160 converts at least 90% or at least 95% of the hydrogen sulfide present in the sour syngas stream 121 (entering the Claus unit 160) into elemental sulfur. The syngas stream 121' exiting the Claus unit 160 continues to the shift/hydrogenation reactor 130.

The Claus unit 160 includes a Claus catalyst 162 that accelerates the reaction between the hydrogen sulfide of the sour syngas stream 121 with the sulfur dioxide of the sulfur dioxide stream 127 to produce sulfur and water. The Claus catalyst 162 can include activated aluminum (III) or titanium (IV) oxide. In some implementations, the Claus unit 160 includes a single-stage Claus process that includes a single reactor train. The reactor train can include a preheater, a Claus reactor including the Claus catalyst 162, and a condenser. The preheater heats the process stream (for example, the sour syngas stream 121) to a temperature that facilitates the conversion of hydrogen sulfide into elemental sulfur and sulfur dioxide (and water) in the presence of the Claus catalyst 162. In some implementations, the preheater heats the process stream (sour syngas stream 121) to provide a catalytic converter maximum bottom bed temperature in a range of from about 300 degrees Celsius (° C.) to about 340° C. After preheating by the preheater, the process stream (sour syngas stream 121) flows to the Claus reactor. The Claus catalyst 162 promotes the conversion of hydrogen sulfide into elemental sulfur and sulfur dioxide (and water). The process stream exiting the Claus reactor then flows to the condenser. The condenser cools the process stream to condense at least a portion of the elemental sulfur to produce a liquid sulfur stream (for example, the sulfur stream 129). The sulfur stream 129 is separated from the process gas (syngas stream 121'). For example, the condenser cools the process stream to a temperature that is cooler than the dew point of sulfur, such that at least a portion of the elemental sulfur in the process stream condenses and separates from a remaining gas portion of the process stream. In some implementations, the Claus unit 160 includes a multi-stage Claus process that includes multiple reactors (for example, a two-stage Claus process including two reactor trains) in series. In a two-stage Claus process, the process stream exiting the condenser of the first reactor train flows to the preheater of the second reactor train. In some implementations, the preheater of the second reactor train heats the process stream to provide a catalytic converter maximum bottom bed temperature that is about 10° C. hotter than the dewpoint of sulfur.

The shift/hydrogenation reactor 130 is configured to receive the syngas stream 121'. In some implementations, the system 100 includes a steam stream 125 that also flows to the shift/hydrogenation reactor 130. Sufficient steam (from the steam stream 125) is provided to the shift/hydrogenation reactor 130 to achieve equilibrium in the shift/hydrogenation reactor 130 for shifting carbon monoxide to carbon dioxide. Providing insufficient steam can retard the shift of carbon monoxide, and the shift reaction may not reach equilibrium, which is disadvantageous. In some implementations, the steam stream 125 mixes with the syngas stream 121' before entering the shift/hydrogenation reactor 130. In some implementations, the steam stream 125 and the syngas stream 121' separately enter the shift/hydrogenation reactor 130 and mix within the shift/hydrogenation reactor 130. The shift/hydrogenation reactor 130 includes a water-gas shift hydrogenation catalyst 132 that is configured to convert at least a portion of the carbon monoxide of the syngas stream 121' and steam from the steam stream 125 to carbon dioxide and hydrogen to produce a shifted gas stream 131. The residual portion of the sulfur dioxide in the syngas stream 121' can be reduced back into hydrogen sulfide (reduction reaction: $SO_2+H_2 \rightarrow H_2S+H_2O$) in the shift/hydrogenation reactor 130. The sulfur (vapor) in the syngas stream 121' can be reduced back into hydrogen sulfide (reduction reaction: $S+H_2 \rightarrow H_2S$) in the shift/hydrogenation reactor 130. Other sulfur-containing compounds (such as carbonyl sulfide (COS) and carbon disulfide ($CS_2$)) in the syngas stream 121' can be hydrolyzed to produce hydrogen sulfide. Because organic sulfur-containing compounds are hydrolyzed into hydrogen sulfide, downstream sulfur removal can be carried out more easily and more efficiently. Further, the sour shift reactions occurring in the shift/hydrogenation reactor 130 eliminates the need for separate COS hydrolysis conditioning. The shifted gas stream 131 exiting the shift/hydrogenation reactor 130 includes more carbon dioxide, more hydrogen, more hydrogen sulfide, and less carbon monoxide in comparison to the syngas stream 121' entering the shift/hydrogenation reactor 130. Because the water-gas shift reaction and reduction reactions are exothermic, the shifted gas stream 131 exiting the shift/hydrogenation reactor 130 is typically higher in temperature in comparison to the syngas stream 121' entering the shift/hydrogenation reactor 130. The steam stream 125 not only provides a source of water for facilitating the production of carbon dioxide and hydrogen, but also provides temperature regulation in the shift/hydrogenation reactor 130.

In some implementations, the shift/hydrogenation reactor 130 includes a pair of reactors with one of the reactors operating at a higher temperature in comparison to the other reactor. For example, a first shift reactor can operate at a temperature in a range of from about 350° C. to about 450° C., while the second shift reactor can operate at a temperature in a range of from about 180° C. to about 300° C. In order to control the operating temperature of the first shift reactor to be within a desired range, the flow rate of steam provided to the first shift reactor may be restricted due to the exothermic nature of the water-gas shift reactions. In some implementations, the first shift reactor includes a first water-gas shift hydrogenation catalyst, and the second shift reactor includes a second water-gas shift hydrogenation catalyst. In some implementations, the first and second water-gas shift hydrogenation catalysts are the same. In some implementations, the first and/or second water-gas shift hydrogenation catalysts are substantially similar to catalysts typically implemented for sulfur recovery unit (SRU) tail gas treatment processes. In some implementations, the first water-gas shift hydrogenation catalyst includes iron oxide, chromium oxide, magnesium oxide, cobalt-molybdenum, aluminum oxide ($Al_2O_3$), or any combination of these. In some implementations, the first water-gas shift hydrogenation catalyst is loaded on a ceramic support or an alumina support. In some implementations, the second water-gas shift hydrogenation catalyst includes copper, copper oxide, zinc oxide, aluminum oxide, cobalt-molybdenum, iron oxide, chromium oxide, magnesium oxide, or any combination of these. In some implementations, the second water-gas shift hydrogenation catalyst is loaded on a ceramic support or an alumina support. As one example, the first and second water-gas shift hydrogenation catalysts are cobalt-molybdenum based catalysts loaded on an alumina support. As another example, the first water-gas shift hydrogenation catalyst can be tailored to focus on hydrogenation reactions, while the second water-gas shift hydrogenation catalyst can be tailored to focus on water-gas shift reactions, or vice versa.

In some implementations, the shift/hydrogenation reactor 130 is configured to convert at least 80%, at least 85%, at least 90%, or at least 95% of the carbon monoxide (CO) in the syngas stream 121' into carbon dioxide ($CO_2$). In some implementations, a molar ratio of hydrogen ($H_2$) to carbon monoxide (CO) in the shifted gas stream 131 exiting the shift/hydrogenation reactor 130 is in a range of from 30:1 to 60:1. In some implementations, a molar ratio of hydrogen ($H_2$) to carbon dioxide ($CO_2$) in the shifted gas stream 131' exiting the shift/hydrogenation reactor 130 is in a range of from 3:2 to 5:2. In some implementations, a molar ratio of hydrogen ($H_2$) to water ($H_2O$), for example, in the form of water vapor) in the shifted gas stream 131 exiting the shift/hydrogenation reactor 130 is in a range of from 3:2 to 5:2. In some implementations, a molar ratio of carbon dioxide ($CO_2$) to water ($H_2O$) in the shifted gas stream 131 exiting the shift/hydrogenation reactor 130 is in a range of from 1:2 to 3:2. For example, a molar ratio of hydrogen ($H_2$) to carbon monoxide (CO) to carbon dioxide ($CO_2$) to water ($H_2O$) in the shifted gas stream 131 exiting the shift/hydrogenation reactor 130 is about 51:1:23:25. The residual portion of the sulfur dioxide and the sulfur (vapor) can be reduced back to hydrogen sulfide, such that no residuals remain in the shifted gas stream 131 exiting the shift/hydrogenation reactor 130.

The quench tower 140 is configured to receive the shifted gas stream 131 and separate water (for example, bulk water phase) from the shifted gas stream 131 to produce a dehydrated gas stream 141. In some implementations, the quench tower 140 receives a water stream 133, and the quench tower 140 contacts the shifted gas stream 131 with the water stream 133. Contacting the shifted gas stream 131 with the water stream 133 causes the shifted gas stream 131 to cool and also causes water in the shifted gas stream 131 (for example, in the form of water vapor) to condense and transfer to the water stream 133. The dehydrated gas stream 141 and a reject water stream 143 discharge from the quench tower 140. The dehydrated gas stream 141 exiting the quench tower 140 has a lower temperature in comparison to the shifted gas stream 131 entering the quench tower 140. In some implementations, the dehydrated gas stream 141 exiting the quench tower 140 has an operating temperature in a range of from about 43° C. to about 60° C. The dehydrated gas stream 141 exiting the quench tower 140 has a lower water content in comparison to the shifted gas stream 131 entering the quench tower 140. In some implementations, the dehydrated gas stream 141 is substantially free of water.

The amine treater 170 includes an absorber 170a and a regenerator 170b. The absorber 170a is configured to receive the dehydrated gas stream 141 and contact the dehydrated gas stream 141 with a lean amine solvent stream 171. The lean amine solvent stream 171 has a high affinity for hydrogen sulfide, and in some cases, also for carbon dioxide. As the lean amine solvent stream 171 contacts the dehydrated gas stream 141, the hydrogen sulfide separates from the dehydrated gas stream 141 and dissolves in the lean amine solvent stream 171. That is, the lean amine solvent stream 171 extracts hydrogen sulfide from the dehydrated gas stream 141. In some cases, the lean amine solvent stream 171 also extracts carbon dioxide from the dehydrated gas stream 141. The dehydrated gas stream 141' exiting the absorber 170a is considered "sweet" and has a lower hydrogen sulfide content in comparison to the dehydrated gas stream 141 entering the absorber 170a. In some implementations, the dehydrated gas stream 141' exiting the absorber 170a has a lower carbon dioxide content in comparison to the dehydrated gas stream 141 entering the absorber 170a. The dehydrated gas stream 141' exiting the absorber 170a continues onto the purifier 150 for separating out the hydrogen product stream 151.

The lean amine solvent stream 171 that has absorbed the hydrogen sulfide (and, in some cases, carbon dioxide) is then considered a rich amine solvent stream 173, which discharges from the absorber 170a. The regenerator 170b is configured to receive the rich amine solvent stream 173 and boil off the hydrogen sulfide (and, in some cases, carbon dioxide) from the rich amine solvent stream 173 to regenerate the lean amine solvent stream 171. The regenerator 170b can be, for example, a distillation column that fractionates the rich amine solvent stream 173 to produce the lean amine solvent stream 171 as a bottoms product and an acid gas stream 175 as a distillate. The lean amine solvent stream 171 is recycled to the absorber 170a. The acid gas stream 175 includes the hydrogen sulfide that has been extracted from the dehydrated gas stream 141. In some implementations, the acid gas stream 175 includes the carbon dioxide that has been extracted from the dehydrated gas stream 141. At least a portion of (for example, all of) the acid gas stream 175 is recycled back to the combustion reactor 110.

The purifier 150 is configured to receive the dehydrated gas stream 141' and separate hydrogen from the dehydrated gas stream 141' to produce a hydrogen product stream 151 and an exhaust stream 153. In some implementations, the system 100 includes a compressor 145 upstream of the purifier 150 to facilitate flow of the dehydrated gas stream 141' to the purifier 150. In some implementations, the compressor 145 is configured to pressurize the dehydrated gas stream 141' to an operating pressure in a range of from about 1,000 kilopascals (kPa) to about 7,000 kPa. The hydrogen product stream 151 includes a majority of the hydrogen from the dehydrated gas stream 141'. In some implementations, the hydrogen product stream 151 has a hydrogen content of at least 95 volume percent (vol. %), at least 96 vol. %, at least 97 vol. %, at least 98 vol. %, at least 99 vol. %, at least 99.5 vol. %, at least 99.9 vol. %, or at least 99.99 vol. %. The exhaust stream 153 includes a remainder of the dehydrated gas stream 141'. For example, the exhaust stream 153 can include carbon monoxide, carbon dioxide, and any hydrocarbon(s) that may have carried over through the system 100 without being combusted in the combustion reactor 110. In some implementations, the system 100 produces about 0.1 kilograms (kg) to about 5 kg of carbon dioxide ($CO_2$) per 1 kg of hydrogen ($H_2$). That is, in some implementations, a mass ratio of carbon dioxide ($CO_2$) in the exhaust stream 153 to hydrogen ($H_2$) in the hydrogen product stream 151 is in a range of from about 0.1:1 to about 5:1. At least a portion of (for example, all of) the exhaust stream 153 can be recycled back to the combustion reactor 110. By recycling at least the portion of the exhaust stream 153 back to the combustion reactor 110, carbon dioxide that has been produced in the system 100 can be recycled within the system 100 without being released to the atmosphere and therefore avoid increasing emissions. In some implementations, a remaining portion of the exhaust stream 153 (not recycled to the combustion reactor 110, shown by the dashed arrow branching from the exhaust stream 153) can be sequestered, for example, within a subterranean formation, such that the carbon dioxide is not released to the atmosphere. In this way, the system 100 is a carbon neutral system, and carbon dioxide emissions by the system 100 can be avoided. In some implementations, the purifier 150 includes a membrane (for example, a polymer membrane) that selectively allows hydrogen to pass through (or pass more quickly in comparison to other components), such that the hydrogen can be separated from the remaining components of the dehydrated gas stream 141. In some implementations, the purifier 150 includes a pair of vessels including an adsorbent, and the pair of vessels implement a pressure swing adsorption process to separate hydrogen from the remaining components of the dehydrated gas stream 141.

The system 100 can include a boiler to utilize heat generated in the system 100 to generate steam. In some implementations, as shown in FIG. 1, the system 100 includes a boiler 161. Although shown in FIG. 1 as including one boiler (161), the system 100 can optionally include additional boilers (for example, two boilers, three boilers, or more than three boilers). The boiler 161 can generate steam 163 at varying operating pressures based on the quality of heat (for example, level of temperature) available in the system 100. For example, the boiler 161 can be configured to use heat generated from the sub-stoichiometric combustion of the sour gas stream 101 within the combustion reactor 110 to generate steam. In using the heat from the combustion reactor 110, the boiler 161 can cool the soot and sour syngas to a temperature in a range of from about 250° C. to about 500° C. In some implementations, as shown in FIG. 1, the boiler 161 is coupled to or at least partially reside within the combustion reactor 110 to receive heat from the combustion reactor 110. In some implementations, at least a portion of the steam 163 generated by the boiler 161 is used to generate power. For example, at least a portion of the steam 163 generated by the boiler 161 can be flowed through a steam turbine 165. The steam 163 flowing through the steam turbine 163 causes blades of the steam turbine 165 to rotate, and the steam turbine 165 generates electrical power in response to rotation of the blades of the steam turbine 165. In some cases, at least a portion of the electrical power generated by the steam turbine 165 is used in the system 100. For example, at least a portion of the electrical power generated by the steam turbine 165 can be used to operate the compressor 145 to pressurize the dehydrated gas stream 141'. The remaining portion of the electrical power generated by the steam turbine 163 can be exported, for example, to a power grid or an end user. The steam 163 exiting the steam turbine 165 can be exported, for example, to a steam header for distribution to different users.

In some implementations, a second boiler (not shown) can be configured to use heat from the soot and syngas to generate steam. In using the heat from the soot and syngas, the second boiler can cool the soot and syngas to a temperature in a range of from about 100° C. to about 200° C. In some implementations, the second boiler is located upstream of the mechanical separator 120. In some implementations, a third boiler (not shown) can be configured to use heat from the shifted gas stream 131 to generate steam. In some implementations, the third boiler is located downstream of the shift/hydrogenation reactor 130 and upstream of the quench tower 140. The steam stream 125 can be at least partially sourced from any one or more of the first boiler 161, second boiler, or third boiler, depending on the operating condition requirements for the steam stream 125. For example, the steam stream 125 that is provided for the shift/hydrogenation reactor 130 can be at least partially sourced from the first boiler 161, the second boiler, the third boiler, or any combination of these.

In some implementations, as shown in FIG. 1, the system 100 includes a feed pre-treatment unit 180 upstream of the combustion reactor 110. The feed pre-treatment unit 180 can be configured to receive and process a high pressure raw sour gas stream 181 (for example, from a sour gas well and/or a gas-oil separation plant) to separate water 183 and natural gas liquids 185 from the high pressure raw sour gas stream 181. For example, the water 183 and the natural gas liquids 185 can be condensed to separate from the sour gas stream 101. The remaining portion of the high pressure raw sour gas stream 181 (excluding the water 183 and the natural gas liquids 185) can be the sour gas stream 101.

In some implementations, as shown in FIG. 1, the system 100 includes a turboexpander 187. The sour gas stream 101 can flow through the turboexpander 187 to generate power. For example, at least a portion of (for example, all of) the sour gas stream 101 can be flowed through the turboexpander 187. The sour gas stream 101 flowing through the turboexpander 187 causes blades of the turboexpander 187 to rotate, and the turboexpander 187 generates electrical power in response to rotation of the blades of the turboexpander 187. In some cases, natural gas liquids 188 drop out (condense) from the sour gas stream 101 from flowing through the turboexpander 187. The natural gas liquids 188 can be combined with the natural gas liquids 185. In some cases, at least a portion of the electrical power generated by the turboexpander 187 is used in the system 100. For example, at least a portion of the electrical power generated by the turboexpander 187 can be used to operate the compressor 145 to pressurize the dehydrated gas stream 141'. The remaining portion of the electrical power generated by the turboexpander 187 can be exported, for example, to a power grid or an end user.

Although not shown in FIG. 1, the system 100 can (and is expected to) include the typical components included in similar systems. For example, in each of the configurations described, process streams (also referred to as "streams") are flowed within each unit and between units of the respective system. The process streams can be flowed using one or more flow control systems implemented throughout the respective system. A flow control system can include one or more flow pumps to pump the liquid process streams, one or more blowers and/or compressors to flow the gaseous process streams, one or more flow pipes through which the process streams are flowed, and one or more flow elements (such as valves and orifice plates) to regulate the flow of streams through the pipes.

In some implementations, a flow control system can be operated manually. For example, an operator can set a flow rate for each pump by changing the position of a valve (open, partially open, or closed) to regulate the flow of the process streams through the pipes in the flow control system. Once the operator has set the flow rates and the valve positions for all flow control systems distributed across the respective system, the flow control system can flow the streams within a unit or between units under constant flow conditions, for example, constant volumetric or mass flow rates. To change the flow conditions, the operator can manually operate the flow control system, for example, by changing the valve position.

In some implementations, a flow control system can be operated automatically. For example, the flow control system can be connected to a computer system to operate the flow control system. The computer system can include a computer-readable medium storing instructions (such as flow control instructions) executable by one or more processors to perform operations (such as flow control operations). For example, an operator can set the flow rates by setting the valve positions for all flow control systems distributed across the respective system using the computer system. In such implementations, the operator can manually change the flow conditions by providing inputs through the computer system. In such implementations, the computer system can automatically (that is, without manual intervention) control one or more of the flow control systems, for example, using feedback systems implemented in one or more units and connected to the computer system. For example, a sensor (such as a pressure sensor or temperature sensor) can be connected to a pipe through which a process stream flows. The sensor can monitor and provide operating conditions (such as a pressure or temperature) of the process stream to the computer system. In response to the operating condition deviating from a set point (such as a target pressure value or target temperature value) or exceeding a threshold (such as a threshold pressure value or threshold temperature value), the computer system can automatically perform operations to adjust properties of the flow control system. For example, if the pressure or temperature in the pipe exceeds the threshold pressure value or the threshold temperature value, respectively, the computer system can provide a signal to open a valve to relieve pressure or a signal to shut down process stream flow.

Figure 2:
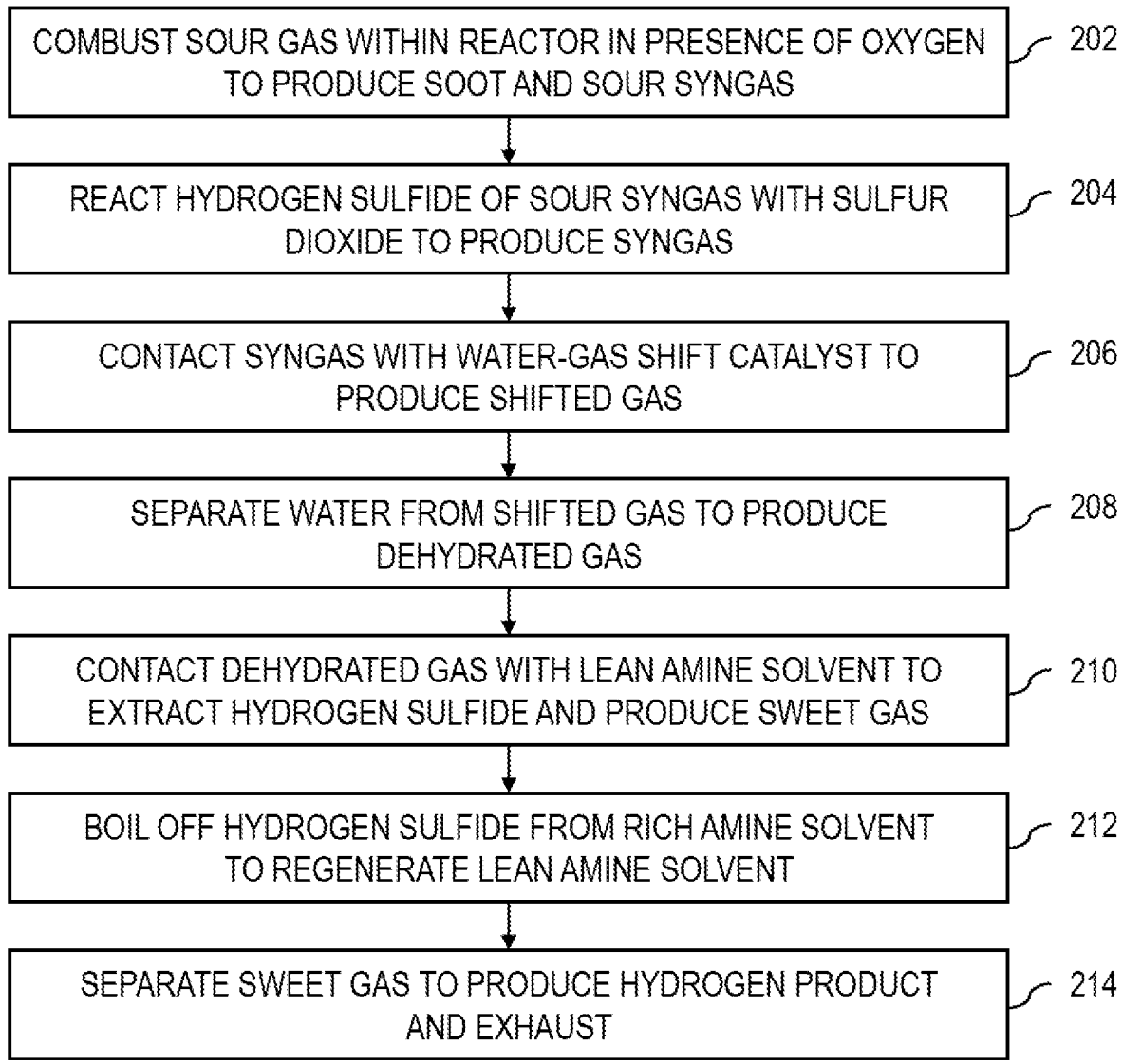
FIG. 2 is a flowchart of an example method for producing hydrogen from gasification of sour gas.

FIG. 2 is a flowchart of an example method 200 for producing hydrogen from gasification of sour gas. The system 100 can, for example, implement the method 200. At block 202, a sour gas stream (such as the sour gas stream 101) is combusted, in the presence of oxygen, within a reactor (such as the combustion reactor 110) to produce soot (such as the soot 123) and a sour syngas stream (such as the sour syngas stream 121). Combusting the sour gas stream 101 within the reactor 110 at block 202 includes sub-stoichiometric combustion of the sour gas stream 101. The sour gas stream 101 has a molar content of carbon (C) and a molar content of hydrogen (H). A molar content of oxygen gas in the reactor 110 at block 202 is in a range of from 10% to 70% of C+H/4. The sub-stoichiometric combustion of the sour gas stream 101 within the reactor 110 at block 202 converts at least 10% of the carbon in the sour gas stream 101 into the soot 123. At block 204, at least a portion of the hydrogen sulfide of the sour syngas stream 121 is reacted with sulfur dioxide (for example, from the sulfur dioxide stream 127) to produce a syngas stream (such as the syngas stream 121'). The Claus unit 160 can, for example, perform block 204. The syngas stream 121' includes the carbon dioxide from the sour syngas stream 121, the carbon monoxide from the sour syngas stream 121, the hydrogen from the sour syngas stream 121, a residual portion of the hydrogen sulfide from the sour syngas stream 121 that did not react in the Claus unit 160, a residual portion of sulfur dioxide that did not react in the Claus unit 160, sulfur vapor, and water (for example, in the form of steam). Sulfur produced by the Claus unit 160 can be separated from the gas to produce the sulfur stream 129 (liquid). At block 206, the syngas stream 121' is contacted with a water-gas shift hydrogenation catalyst (such as the water-gas shift hydrogenation catalyst 132) in a shift reactor (such as the shift/hydrogenation reactor 130) in the presence of steam (such as steam from the steam stream 125) to convert at least a portion of the carbon monoxide (from the syngas stream 121') and steam into carbon dioxide and hydrogen to produce a shifted gas stream (such as the shifted gas stream 131). Contacting the syngas stream 121' with the water-gas shift hydrogenation catalyst 132 in the shift/hydrogenation reactor 130 in the presence of steam at block 206 can also result in reducing the residual portion of sulfur dioxide and sulfur vapor into hydrogen sulfide, such that the shifted gas stream 131 is substantially free of sulfur dioxide and sulfur vapor. At block 208, water is separated from the shifted gas stream 131 to produce a dehydrated gas stream (such as the dehydrated gas stream 141). For example, the shifted gas stream 131 is contacted with water (such as the water stream 133) in a quench tower (such as the quench tower 140) at block 208. Contacting the shifted gas stream 131 with the water stream 133 in the quench tower 140 at block 208 can cause the shifted gas stream 131 to cool and can also cause water in the shifted gas stream 131 (for example, in the form of water vapor) to condense and transfer to the water stream 133. At block 210, the dehydrated gas stream 141 is contacted with a lean amine solvent (such as the lean amine solvent stream 171) to extract the residual portion of the hydrogen sulfide from the dehydrated gas stream 141 into the lean amine solvent stream 171 to produce a sweet gas stream (such as the dehydrated gas stream 141') and a rich amine solvent (such as the rich amine solvent stream 173). The dehydrated gas stream 141' produced at block 210 includes carbon dioxide and hydrogen. The dehydrated gas stream 141' produced at block 210 can also include hydrogen sulfide, carbon monoxide, and residual hydrocarbons. The absorber 170a can, for example, perform block 210. At block 212, the residual portion of the hydrogen sulfide is boiled off from the rich amine solvent stream 173 to produce an acid gas stream (such as the acid gas stream 175) and regenerate the lean amine solvent stream 171. The acid gas stream 175 produced at block 212 includes the residual portion of the hydrogen sulfide, and in some cases, carbon dioxide. The regenerator 170b can, for example, perform block 212. In some implementations, at least a portion of (for example, all of) the acid gas stream 175 produced at block 212 is recycled to the combustion reactor 110. At block 214, the sweet gas stream (dehydrated gas stream 141') is separated to produce a hydrogen product stream (such as the hydrogen product stream 151) and an exhaust stream (such as the exhaust stream 153). The hydrogen product stream 151 produced at block 214 includes a majority of the hydrogen from the dehydrated gas stream 141'. The exhaust stream 153 produced at block 214 includes a remainder of the dehydrated gas stream 141' (for example, carbon dioxide). The purifier 150 can, for example, perform block 214. In some implementations, at least a portion of the exhaust stream 153 produced at block 214 is recycled to the combustion reactor 110. A remaining portion of the exhaust stream 153 produced at block 214 that is not recycled to the combustion reactor 110 can, for example, be sequestered within a subterranean formation (such as a disposal well) to avoid releasing carbon dioxide into the atmosphere.

Figure 3:
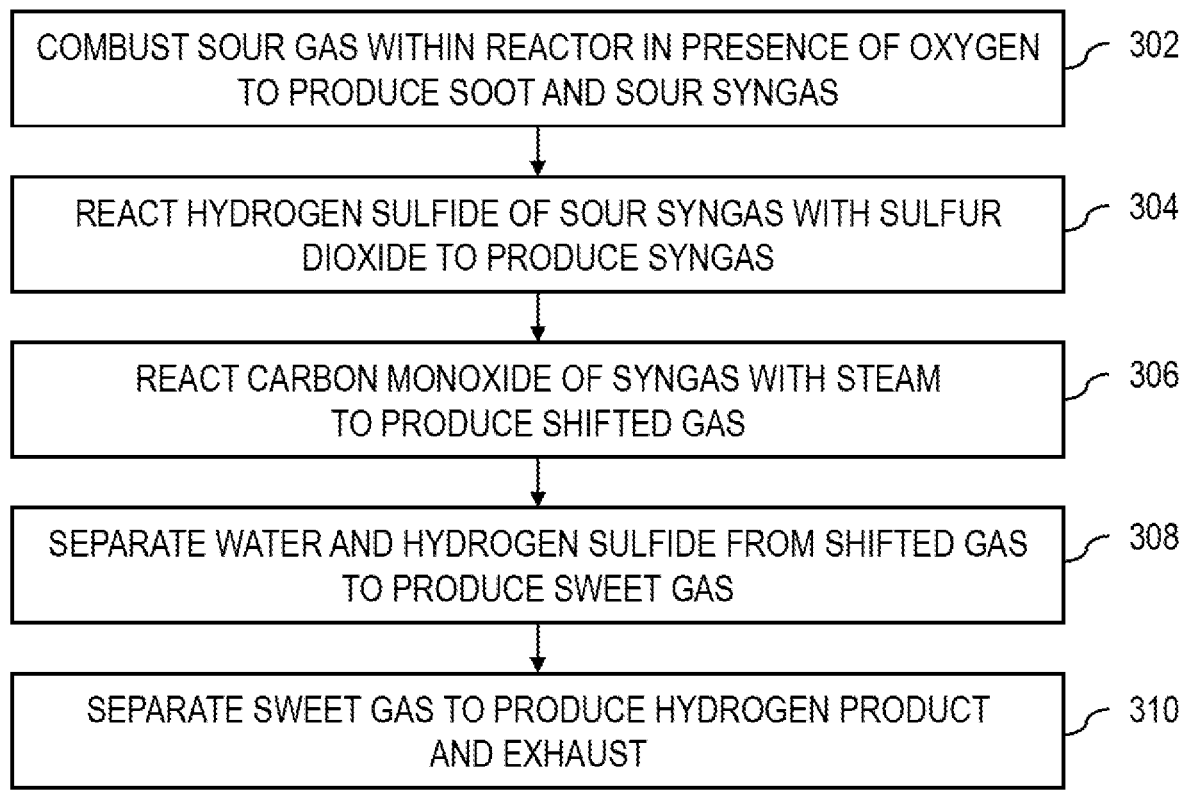
FIG. 3 is a flowchart of an example method for producing hydrogen from gasification of sour gas.

FIG. 3 is a flowchart of an example method 300 for producing hydrogen from gasification of sour gas. The system 100 can, for example, implement the method 300. At block 302, a sour gas stream (such as the sour gas stream 101) is combusted, in the presence of oxygen, to produce soot (such as the soot 123) and a sour syngas stream (such as the sour syngas stream 121). Combusting the sour gas stream 101 at block 302 includes sub-stoichiometric combustion of the sour gas stream 101. The sour gas stream 101 has a molar content of carbon (C) and a molar content of hydrogen (H). A molar content of oxygen gas at block 302 is in a range of from 10% to 70% of C+H/4. The sub-stoichiometric combustion of the sour gas stream 101 at block 302 converts at least 10% of the carbon in the sour gas stream 101 into the soot 123. The combustion reactor 110 can, for example, perform block 302. At block 304, at least a portion of the hydrogen sulfide of the sour syngas stream 121 is reacted with sulfur dioxide (for example, from the sulfur dioxide stream 127) to produce a syngas stream (such as the syngas stream 121'). The Claus unit 160 can, for example, perform block 304. The syngas stream 121' includes the carbon dioxide from the sour syngas stream 121, the carbon monoxide from the sour syngas stream 121, the hydrogen from the sour syngas stream 121, a residual portion of the hydrogen sulfide from the sour syngas stream 121 that did not react in the Claus unit 160, and water (for example, in the form of steam). Sulfur produced by the Claus unit 160 can be separated from the gas, such that the syngas stream 121' exiting the Claus unit 160 is free of elemental sulfur. At block 306, at least a portion of the carbon monoxide of the syngas stream 121' is reacted with steam (such as steam from the steam stream 125) in the presence of a water-gas shift hydrogenation catalyst (such as the water-gas shift hydrogenation catalyst 132) to produce a shifted gas stream (such as the shifted gas stream 131). The shift/hydrogenation reactor 130 can, for example, perform block 306. Reacting the carbon monoxide with steam at block 306 produces carbon dioxide and hydrogen. Thus, the shifted gas stream 131 produced at block 306 includes more carbon dioxide, more hydrogen, and less carbon monoxide in comparison to the syngas stream 121'. At block 308, water and the residual portion of the hydrogen sulfide are separated from the shifted gas stream 131 to produce a sweet gas stream (such as the dehydrated gas stream 141'). The water can be separated from the shifted gas stream 131 at block 308, for example, contacting the shifted gas stream 131 with water (such as the water stream 133) in a quench tower (such as the quench tower 140), causes the shifted gas stream 131 to cool and also causes water in the shifted gas stream 131 (for example, in the form of water vapor) to condense and transfer to the water stream 133, thereby forming a dehydrated gas stream (such as the dehydrated gas stream 141). Hydrogen sulfide can be separated from the shifted gas stream 131 at block 308, for example, by contacting a portion of the shifted gas stream 131 (such as the dehydrated gas stream 141) with a lean amine solvent (such as the lean amine solvent stream 171) to extract the residual portion of the hydrogen sulfide from the dehydrated gas stream 141 into the lean amine solvent stream 171 to produce the sweet gas stream (dehydrated gas stream 141') and a rich amine solvent (such as the rich amine solvent stream 173). The dehydrated gas stream 141' produced at block 308 includes carbon dioxide and hydrogen. The absorber 170a can, for example, separate the hydrogen sulfide at block 308. At block 310, the sweet gas stream (dehydrated gas stream 141') is separated into a hydrogen product stream (such as the hydrogen product stream 151) and an exhaust stream (such as the exhaust stream 153). The hydrogen product stream 151 produced at block 310 includes a majority of hydrogen from the dehydrated gas stream 141'. The exhaust stream 153 produced at block 310 includes a remainder of the dehydrated gas stream 141' (for example, carbon dioxide). The purifier 150 can, for example, perform block 310. In some implementations, at least a portion of the exhaust stream 153 produced at block 310 is recycled to the combustion reactor 110. A remaining portion of the exhaust stream 153 produced at block 310 that is not recycled to the combustion reactor 110 can, for example, be sequestered within a subterranean formation (such as a disposal well) to avoid releasing carbon dioxide into the atmosphere.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

Embodiments

In an example implementation (or aspect), a method comprises: combusting, in the presence of oxygen, a sour gas stream within a reactor to produce soot and a sour syngas stream comprising carbon dioxide, carbon monoxide, hydrogen, and hydrogen sulfide, wherein the sour gas stream comprises hydrogen sulfide and at least one hydrocarbon, wherein combusting the sour gas stream within the reactor comprises sub-stoichiometric combustion of the sour gas stream, wherein the sour gas stream has a molar content of carbon (C) and a molar content of hydrogen (H), wherein a molar content of oxygen gas in the reactor is in a range of from 10% to 70% of C+H/4, wherein the sub-stoichiometric combustion of the sour gas stream within the reactor converts at least 10% of the carbon in the sour gas stream into the soot; reacting at least a portion of the hydrogen sulfide of the sour syngas stream with sulfur dioxide to produce a syngas stream comprising the carbon dioxide, the carbon monoxide, the hydrogen, water, elemental sulfur vapor, a residual portion of the hydrogen sulfide, and a residual portion of the sulfur dioxide, wherein reacting at least the portion of the hydrogen sulfide of the sour syngas stream with sulfur dioxide produces a sulfur stream comprising elemental sulfur liquid; contacting, in the presence of steam, the syngas stream with a water-gas shift hydrogenation catalyst in a shift reactor to convert at least a portion of the carbon monoxide and steam to carbon dioxide and hydrogen to produce a shifted sour gas stream, wherein contacting the syngas stream with the water-gas shift hydrogenation catalyst in the shift reactor in the presence of steam reduces the elemental sulfur vapor and the residual portion of the sulfur dioxide into hydrogen sulfide, and the shifted sour gas stream is substantially free of elemental sulfur and sulfur dioxide; separating water from the shifted sour gas stream to produce a dehydrated sour gas stream; contacting the dehydrated sour gas stream with a lean amine solvent to extract the residual portion of the hydrogen sulfide from the dehydrated sour gas stream into the lean amine solvent to produce a sweet gas stream and a rich amine solvent, the sweet gas stream comprising the carbon dioxide and the hydrogen; boiling off the residual portion of the hydrogen sulfide from the rich amine solvent to produce an acid gas stream and regenerate the lean amine solvent, the acid gas stream comprising the residual portion of the hydrogen sulfide; and separating the sweet gas stream to produce a hydrogen product stream and an exhaust stream, the hydrogen product stream comprising a majority of the hydrogen from the sweet gas stream, and the exhaust stream comprising a remainder of the sweet gas stream.

In an example implementation (or aspect) combinable with any other example implementation (or aspect), at least a portion of heat generated from sub-stoichiometric combustion of the sour gas stream within the reactor is directed to a boiler to generate steam and cool the soot and sour syngas to a temperature in a range of from about 250 degrees Celsius (° C.) to about 500° C.

In an example implementation (or aspect) combinable with any other example implementation (or aspect), at least a portion of the steam stream is sourced from the steam generated by the boiler.

In an example implementation (or aspect) combinable with any other example implementation (or aspect), at least a portion of the steam generated by the boiler is flowed through a steam turbine, wherein the steam turbine generates electrical power in response to flow of the portion of the steam through the turbine.

In an example implementation (or aspect) combinable with any other example implementation (or aspect), separating water from the shifted sour gas stream comprises contacting the shifted sour gas stream with a water stream within a quench tower and discharging a reject water stream and the dehydrated sour gas stream from the quench tower.

In an example implementation (or aspect) combinable with any other example implementation (or aspect), at least a portion of the acid gas stream is recycled to the reactor.

In an example implementation (or aspect) combinable with any other example implementation (or aspect), at least a portion of the exhaust stream is recycled to the reactor.

In an example implementation (or aspect) combinable with any other example implementation (or aspect), a second portion of the exhaust stream is sequestered within a subterranean formation to avoid releasing carbon dioxide to the atmosphere.

In an example implementation (or aspect) combinable with any other example implementation (or aspect), a high pressure raw sour gas stream is processed in a feed pre-treatment unit, wherein processing the high pressure raw sour gas stream in the feed pre-treatment unit comprises: separating water from the high pressure raw sour gas stream; and condensing natural gas liquids from the high pressure raw sour gas stream to produce a natural gas liquids (NGL) stream and the sour gas stream.

In an example implementation (or aspect) combinable with any other example implementation (or aspect), the sour gas stream is flowed through a turboexpander prior to combusting the sour gas stream within the reactor, wherein the turboexpander generates electrical power in response to flow of the sour gas stream through the turboexpander.

In an example implementation (or aspect), a system comprises: a sour gas stream comprising hydrogen sulfide and at least one hydrocarbon, the sour gas stream having a molar flow rate of carbon (C) and a molar flow rate of hydrogen (H); an oxidizing stream comprising oxygen gas and having a molar flow rate of oxygen gas ($O_2$) in a range of from 10% to 70% of C+H/4; a combustion reactor configured to receive the sour gas stream and the oxidizing stream, the combustion reactor configured to combust the sour gas stream to produce soot and sour syngas, wherein sub-stoichiometric combustion of the sour gas stream within the combustion reactor converts at least 10% of the carbon in the sour gas stream into soot; a mechanical separator configured to separate the soot from the sour syngas to produce a sour syngas stream comprising carbon dioxide, carbon monoxide, hydrogen, and hydrogen sulfide; a Claus unit configured to receive the sour syngas stream and a sulfur dioxide stream comprising sulfur dioxide, the Claus unit configured to react at least a portion of the hydrogen sulfide of the sour syngas stream with the sulfur dioxide of the sulfur dioxide stream to produce elemental sulfur and water, the Claus unit configured to discharge a sulfur stream comprising the elemental sulfur, the Claus unit configured to discharge a syngas stream comprising the carbon dioxide, the carbon monoxide, the hydrogen, the water, elemental sulfur vapor, a residual portion of the hydrogen sulfide, and a residual portion of the sulfur dioxide; a sour shift/hydrogenation reactor configured to receive the syngas stream and steam, the sour shift/hydrogenation reactor comprising a water-gas shift hydrogenation catalyst, the water-gas shift hydrogenation catalyst configured to convert at least a portion of the carbon monoxide of the syngas stream and steam to carbon dioxide and hydrogen to produce a shifted sour gas stream, the water-gas shift hydrogenation catalyst configured to reduce the elemental sulfur vapor and the residual portion of the sulfur dioxide into hydrogen sulfide, the shifted sour gas stream substantially free of elemental sulfur and sulfur dioxide; a quench tower configured to receive the shifted sour gas stream and separate water from the shifted sour gas stream to produce a dehydrated sour gas stream; an amine unit configured to receive the dehydrated sour gas stream, the amine unit configured to contact the dehydrated sour gas stream with a lean amine solvent to extract the residual portion of the hydrogen sulfide from the dehydrated sour gas stream into the lean amine solvent to produce a sweet gas stream and a rich amine solvent, the sweet gas stream comprising the carbon dioxide and the hydrogen, the amine unit configured to boil off the residual portion of the hydrogen sulfide from the rich amine solvent to produce an acid gas stream and regenerate the lean amine solvent, the acid gas stream comprising the residual portion of the hydrogen sulfide; and a purifier configured to receive the sweet gas stream and separate hydrogen from the sweet gas stream to produce a hydrogen product stream and an exhaust stream, the hydrogen product stream comprising a majority of the hydrogen from the sweet gas stream, the exhaust stream comprising a remainder of the sweet gas stream, wherein the combustion reactor is configured to receive at least a portion of the exhaust stream.

In an example implementation (or aspect) combinable with any other example implementation (or aspect), the system comprises a boiler configured to use heat generated from combustion of the sour gas stream within the combustion reactor to generate steam and cool the soot and sour syngas to a temperature in a range of from about 250 degrees Celsius (° C.) to about 500° C.

In an example implementation (or aspect) combinable with any other example implementation (or aspect), the sour shift/hydrogenation reactor is configured to receive at least a portion of the steam generated by the boiler.

In an example implementation (or aspect) combinable with any other example implementation (or aspect), the system comprises a steam turbine configured to receive at least a portion of the steam generated by the boiler, the steam turbine configured to generate electrical power in response to the portion of the steam flowing through the steam turbine.

In an example implementation (or aspect) combinable with any other example implementation (or aspect), the combustion reactor is configured to receive at least a portion of the acid gas stream.

In an example implementation (or aspect) combinable with any other example implementation (or aspect), a second portion of the exhaust stream is sequestered within a subterranean formation to avoid releasing carbon dioxide to the atmosphere.

In an example implementation (or aspect) combinable with any other example implementation (or aspect), the system comprises a feed pre-treatment unit upstream of the combustion reactor, wherein the feed pre-treatment unit is configured to process a high pressure raw sour gas stream to separate water and natural gas liquids from the high pressure raw sour gas stream to produce a reject water stream, a natural gas liquids (NGL) stream, and the sour gas stream.

In an example implementation (or aspect) combinable with any other example implementation (or aspect), the system comprises a turboexpander downstream of the feed pre-treatment unit and upstream of the combustion reactor, wherein the turboexpander is configured to receive the sour gas stream and generate electrical power in response to flow of the sour gas stream through the turboexpander, wherein the turboexpander is configured to discharge the sour gas stream to the combustion reactor.

In an example implementation (or aspect), a method comprises: combusting, in the presence of oxygen, a sour gas stream to produce soot and a sour syngas stream comprising carbon dioxide, carbon monoxide, hydrogen, and hydrogen sulfide, wherein the sour gas stream comprises hydrogen sulfide and at least one hydrocarbon, wherein combusting the sour gas stream comprises sub-stoichiometric combustion of the sour gas stream, wherein the sour gas stream has a molar content of carbon (C) and a molar content of hydrogen (H), wherein a molar content of the oxygen that is present is in a range of from 10% to 70% of C+H/4, wherein the sub-stoichiometric combustion of the sour gas stream converts at least 10% of the carbon in the sour gas stream into the soot; reacting at least a portion of the hydrogen sulfide of the sour syngas stream with sulfur dioxide to produce a syngas stream comprising the carbon dioxide, the carbon monoxide, the hydrogen, water, elemental sulfur vapor, a residual portion of the hydrogen sulfide, and a residual portion of the sulfur dioxide, wherein reacting at least the portion of the hydrogen sulfide of the sour syngas stream with sulfur dioxide produces a sulfur stream comprising elemental sulfur liquid; reacting, in the presence of a water-gas shift hydrogenation catalyst, at least a portion of the carbon monoxide of the syngas stream with steam to produce a shifted sour gas stream, wherein the shifted gas sour stream comprises more carbon dioxide, more hydrogen, more hydrogen sulfide, and less carbon monoxide in comparison to the syngas stream prior to reacting the carbon monoxide, and the shifted sour gas stream is substantially free of elemental sulfur and sulfur dioxide; separating water and the residual portion of the hydrogen sulfide from the shifted sour gas stream to produce a sweet gas stream; and separating the sweet gas stream into a hydrogen product stream and an exhaust stream, wherein the hydrogen product stream comprises a majority of the hydrogen from the sweet gas stream, and the exhaust stream comprises a remainder of the sweet gas stream.

In an example implementation (or aspect) combinable with any other example implementation (or aspect), at least a portion of heat generated from combustion of the sour gas stream is directed to a boiler to generate steam and using at least a portion of the generated steam to react with at least the portion of the carbon monoxide of the syngas stream in the presence of the water-gas shift hydrogenation catalyst.

What is claimed is:

1. A system comprising:
   a sour gas stream comprising hydrogen sulfide and at least one hydrocarbon, the sour gas stream having a molar flow rate of carbon (C) and a molar flow rate of hydrogen (H);
   an oxidizing stream comprising oxygen gas and having a molar flow rate of oxygen gas ($O_2$) in a range of from 10% to 70% of C+H/4;
   a combustion reactor configured to receive the sour gas stream and the oxidizing stream, the combustion reactor configured to combust the sour gas stream to produce soot and sour syngas, wherein sub-stoichiometric combustion of the sour gas stream within the combustion reactor converts at least 10% of the carbon in the sour gas stream into soot;
   a mechanical separator configured to separate the soot from the sour syngas to produce a sour syngas stream comprising carbon dioxide, carbon monoxide, hydrogen, and hydrogen sulfide;
   a Claus unit configured to receive the sour syngas stream and a sulfur dioxide stream comprising sulfur dioxide, the Claus unit configured to react at least a portion of the hydrogen sulfide of the sour syngas stream with the sulfur dioxide of the sulfur dioxide stream to produce elemental sulfur and water, the Claus unit configured to discharge a sulfur stream comprising the elemental sulfur, the Claus unit configured to discharge a syngas stream comprising the carbon dioxide, the carbon monoxide, the hydrogen, the water, elemental sulfur vapor, a residual portion of the hydrogen sulfide, and a residual portion of the sulfur dioxide;
   a sour shift/hydrogenation reactor configured to receive the syngas stream and stean, the sour shift/hydrogenation reactor comprising a water-gas shift hydrogenation catalyst, the water-gas shift hydrogenation catalyst configured to convert at least a portion of the carbon monoxide of the syngas stream and steam to carbon dioxide and hydrogen to produce a shifted sour gas stream, the water-gas shift hydrogenation catalyst configured to reduce the elemental sulfur vapor and the residual portion of the sulfur dioxide into hydrogen sulfide, the shifted sour gas stream substantially free of elemental sulfur and sulfur dioxide;
   a quench tower configured to receive the shifted sour gas stream and separate water from the shifted sour gas stream to produce a dehydrated sour gas stream;
   an amine unit configured to receive the dehydrated sour gas stream, the amine unit configured to contact the dehydrated sour gas stream with a lean amine solvent to extract the residual portion of the hydrogen sulfide from the dehydrated sour gas stream into the lean amine solvent to produce a sweet gas stream and a rich amine solvent, the sweet gas stream comprising the carbon dioxide and the hydrogen, the amine unit configured to boil off the residual portion of the hydrogen sulfide from the rich amine solvent to produce an acid gas stream and regenerate the lean amine solvent, the acid gas stream comprising the residual portion of the hydrogen sulfide; and
   a purifier configured to receive the sweet gas stream and separate hydrogen from the sweet gas stream to produce a hydrogen product stream and an exhaust stream, the hydrogen product stream comprising a majority of the hydrogen from the sweet gas stream, the exhaust stream comprising a remainder of the sweet gas stream, wherein the combustion reactor is configured to receive at least a portion of the exhaust stream.

2. The system of claim 1, comprising a boiler configured to use heat generated from combustion of the sour gas stream within the combustion reactor to generate steam and cool the soot and sour syngas to a temperature in a range of from about 250 degrees Celsius (° C.) to about 500° C.

3. The system of claim 2, wherein the sour shift hydrogenation reactor is configured to receive at least a portion of the steam generated by the boiler.

4. The system of claim 2, comprising a steam turbine configured to receive at least a portion of the steam generated by the boiler, the steam turbine configured to generate electrical power in response to the portion of the steam flowing through the steam turbine.

5. The system of claim 1, wherein the combustion reactor is configured to receive at least a portion of the acid gas stream.

6. The system of claim 1, wherein a second portion of the exhaust stream is sequestered within a subterranean formation to avoid releasing carbon dioxide to the atmosphere.

7. The system of claim 1, comprising a feed pre-treatment unit upstream of the combustion reactor, wherein the feed pre-treatment unit is configured to process a high pressure raw sour gas stream to separate water and natural gas liquids from the high pressure raw sour gas stream to produce a reject water stream, a natural gas liquids (NGL) stream, and the sour gas stream.

8. The system of claim 7, comprising a turboexpander downstream of the feed pre-treatment unit and upstream of the combustion reactor, wherein the turboexpander is configured to receive the sour gas stream and generate electrical power in response to flow of the sour gas stream through the turboexpander, wherein the turboexpander is configured to discharge the sour gas stream to the combustion reactor.

* * * * *